United States Patent [19]

Lohmann

[11] Patent Number: 4,986,593
[45] Date of Patent: Jan. 22, 1991

[54] WORK CABIN HAVING A FRONT WINDOWPANE

[75] Inventor: Karl Lohmann, Datteln, Fed. Rep. of Germany

[73] Assignee: O & K Orenstein & Koppel Aktiengesellschaft, Dortmund

[21] Appl. No.: 360,211

[22] Filed: Jun. 2, 1989

[30] Foreign Application Priority Data

Jun. 24, 1988 [DE] Fed. Rep. of Germany ....... 3821308

[51] Int. Cl.⁵ ............................................. B62D 33/06
[52] U.S. Cl. .................................... 296/190; 296/201; 49/450
[58] Field of Search .............. 296/190, 201, 89, 96.21; 49/450

[56] References Cited

U.S. PATENT DOCUMENTS

| 788,188 | 4/1905 | Chamberlin | 296/96.21 |
|---|---|---|---|
| 3,866,969 | 2/1975 | Sandrock et al. | 296/190 |
| 4,009,901 | 3/1977 | Barbee | 296/190 |
| 4,116,483 | 9/1978 | Kramer et al. | 296/190 |
| 4,443,035 | 4/1984 | Saemann | 296/190 |
| 4,518,195 | 5/1985 | Tindall et al. | 296/96.21 X |
| 4,880,269 | 11/1989 | Jensen et al. | 296/190 |

FOREIGN PATENT DOCUMENTS

214013 9/1987 Japan ................................... 296/201
644238 10/1950 United Kingdom ................ 296/190

*Primary Examiner*—Johnny D. Cherry
*Assistant Examiner*—Joseph D. Pape
*Attorney, Agent, or Firm*—Robert W. Becker & Associates

[57] ABSTRACT

A work cabin having a front windowpane, which is to be introducible and fixable in the interior roof space of the cabin, and having roller bearings, which are laterally articulated in the vicinity of corner regions of the front windowpane and are guided in two U-shaped guide rails. Respective spring cable pulleys are disposed in extensions of upper portions of the guide rails remote from the closed position of the front windowpane. Cable ends of the pulleys are guided over guide rollers and are attached to lower poritons of the front windowpane. A shaft spans the upper corner regions of the front windowpane between the roller bearings at those locations, with a hand lever being provided on the shaft for rotating the same. The upper portion of the front windowpane, which is indirectly supported on the upper roller bearings and on the guide rails, is guided into or out of the roof space via rotation of eccentric wheels that are provided laterally on the shaft, with the front windowpane thereby being releasable from or fixable to the cabin frame for the front window over the entire path of the guide rails.

9 Claims, 5 Drawing Sheets

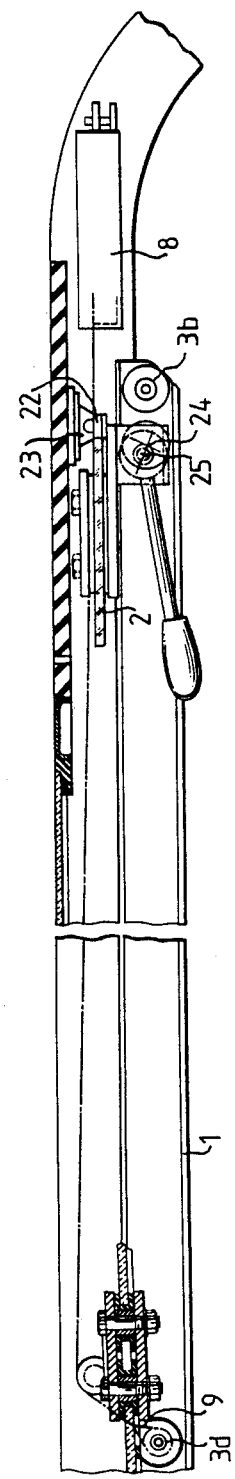

WORK CABIN HAVING A FRONT WINDOWPANE

BACKGROUND OF THE INVENTION

The present invention relates to a work or operating cabin that has a front windowpane, which is to be introducible and fixable in the interior roof space of the cabin, and that has roller bearings, which are laterally articulated in the vicinitY of corner regions of the front windowpane and are guided in two U-shaped guide rails of the cabin.

With work cabins where the field of operation is toward the front, it is often necessary, be it for reasons of sight, sound, or weather, to establish a direct contact between the operating personnel in the cabin and the work site.

It is therefore an object of the present invention, in an economical and operationally reliable manner, to make it possible to entirely or partially remove and stow the normally provided main and/or individual panes of the overall front windowpane surface.

BRIEF DESCRIPTION OF THE DRAWINGS

This object, and other objects and advantages of the present invention, will appear more clearly from the following specification in conjunction with the accompanying schematic drawings, in which:

FIG. 5 is a partially cross-sectioned view showing the front windowpane fixed in its upper end position.

SUMMARY OF THE INVENTION

The work cabin of the present invention is characterized primarily by: respective spring cable pulleys that are disposed in extensions of upper portions of both of the guide rails, remote from the closed position of the front windowpane; guide rollers that are secured to walls of the cabin, with the spring cable pulleys having cable ends that are guided over the guide rollers and are attached to lower portions of the front windowpane when viewed in the closed position thereof; a shaft that spans the upper corner regions of the front windowpane between the roller bearings there; a hand lever that is provided on the shaft for rotating the same; and eccentric wheels that are provided laterally on the shaft, whereby the upper portion of the front windowpane, which is indirectly supported on the roller bearings associated with the upper corner regions thereof and on the guide rails, is guided into or out of the roof space of the cabin via rotation of the eccentric wheels, with the front windowpane thereby being releasable from or fixable to the cabin frame for the front window over the entire path of the guide rails.

Further specific features of the present invention will be described in detail subsequently.

DESCRIPTION OF PREFERRED EMBODIMENTS

Figure 1:
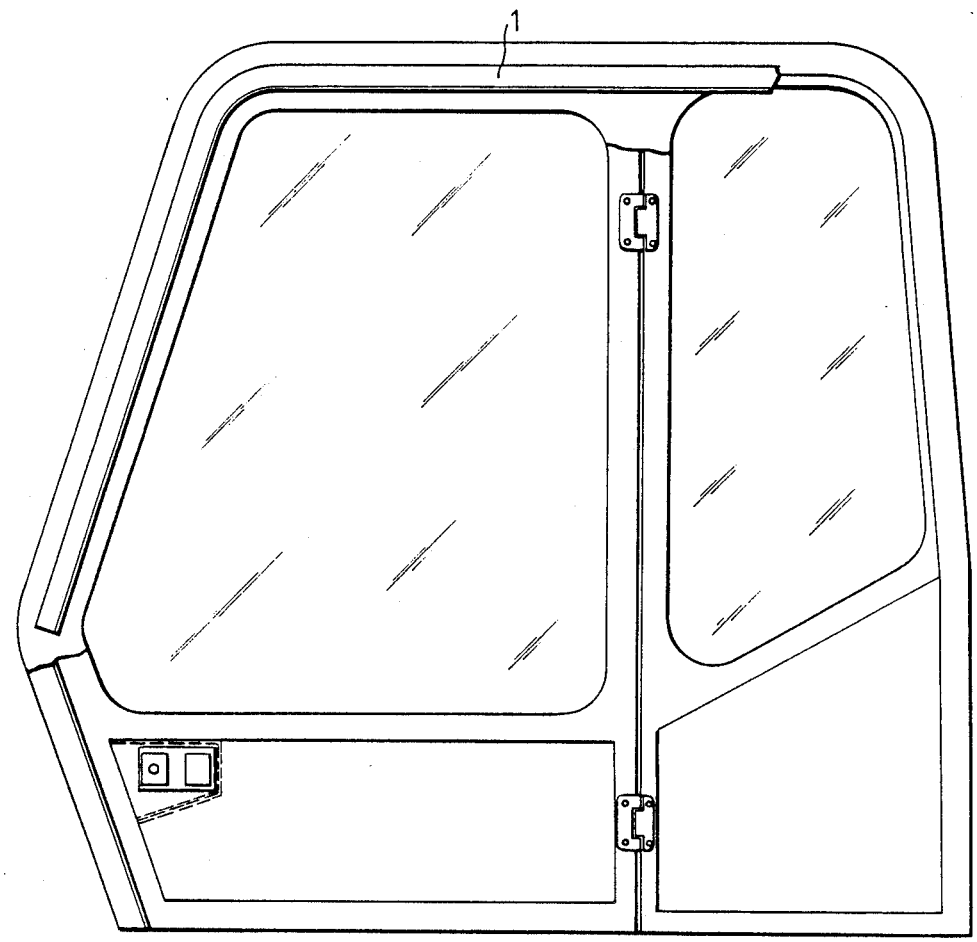
FIG. 1 is a side view of one exemplary embodiment of the inventive work cabin.

Referring now to the drawings in detail, FIG. 1 is a side view of a work or operation cabin that can be accessed by, for example, at least one door via which operating personnel can enter and exit, and that also has further side windows. FIG. 1 shows in particular the disposition of one of the two U-shaped guide rails 1 that enable the introduction and fixing of a front windowpane into the interior roof space.

Figure 2:
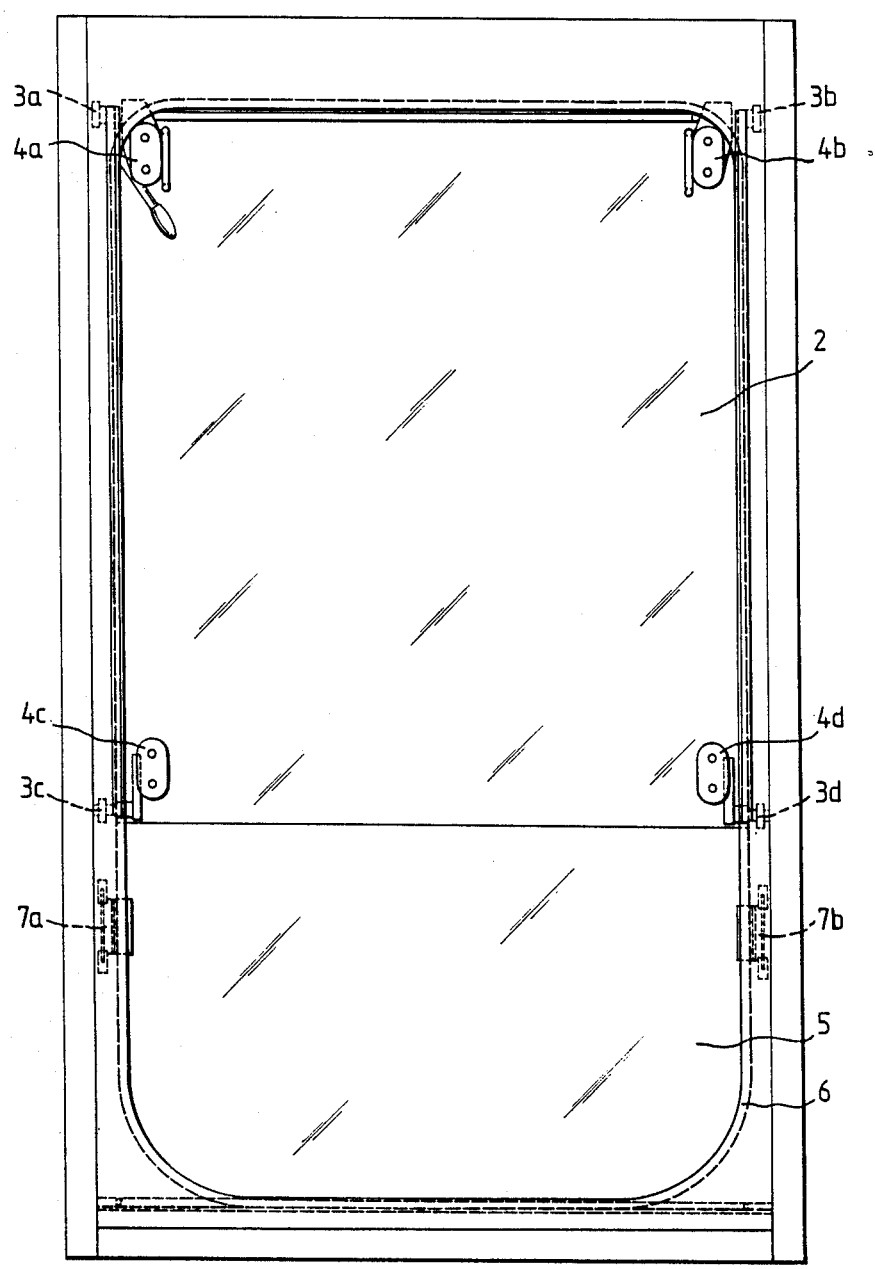
FIG. 2 is a view of the front windowpane of the cabin of FIG. 1.

FIG. 2 is a view of the front windowpane 2 and roller bearings 3a, 3b, 3c, 3d that are laterally articulated in the corner regions of the window and that are connected with the front windowpane 2 via securing means 4a, 4b, 4c, 4d.

FIG. 2 furthermore shows that the front windowpane 2 represents only a portion of the overall larger front window, which is composed of several individual panes. For example, also provided is a lower windowpane 5 that can similarly be removed from the front frame in a known manner, for example via combinations of insertion and clamping mechanisms. The lower pane 5 is introduced into an insertion frame 6 and is fixed in position via support means 7a and 7b that can be clamped or locked.

By removing not only the front windowpane 2 but also the lower windowpane 5, direct visual and sound contact between the operator in the cabin and the work site can be established.

Figure 3:
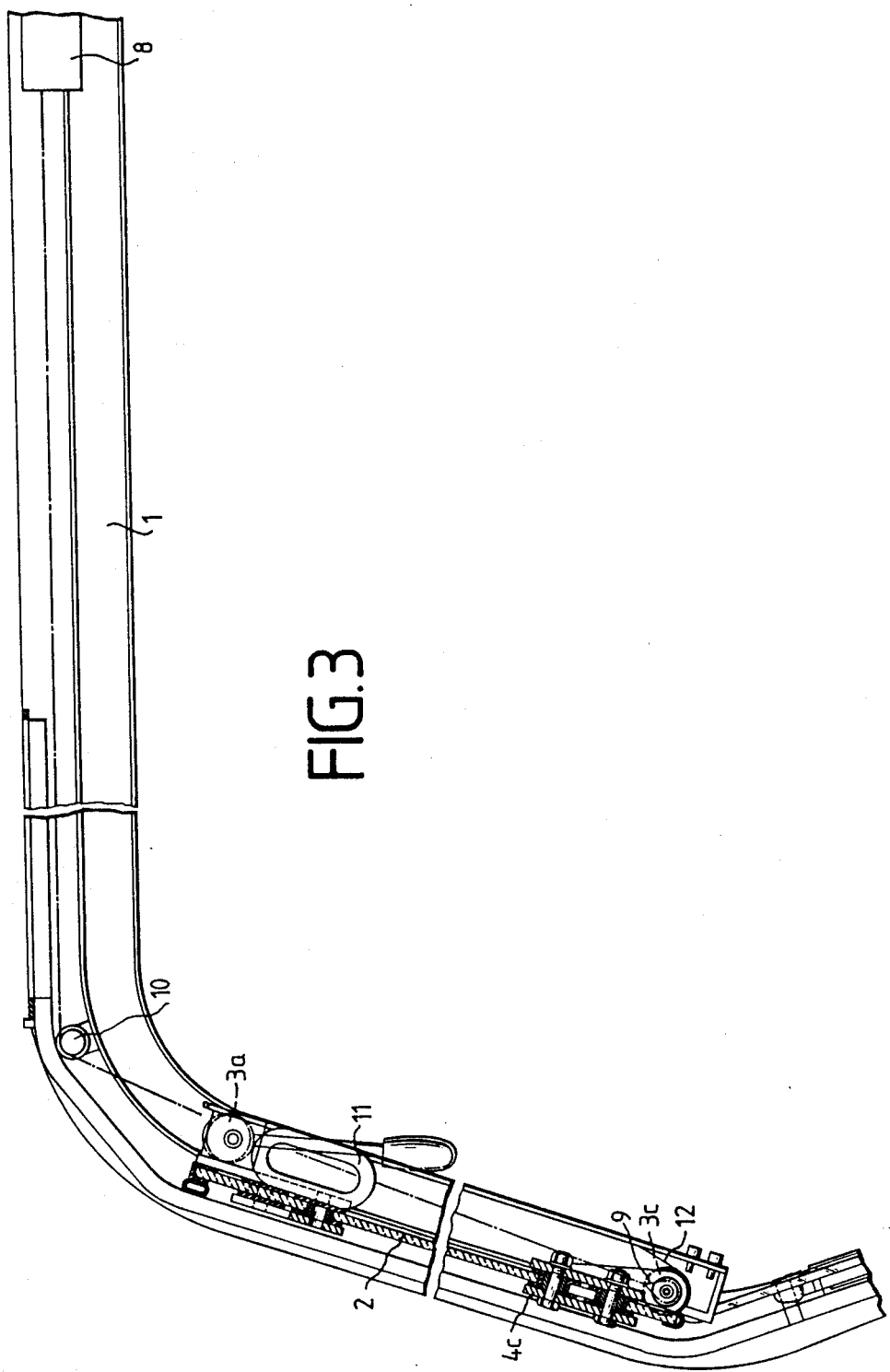
FIG. 3 is a partially cross-sectioned view showing the path of movement of the front windowpane into the interior roof space of the cabin.

The partially cross-sectioned view of FIG. 3 clearly shows the path of movement of the front windowpane 2 into the interior roof space of the operator's cab or cabin. In order to make this easy for the operator to be able to accomplish, spring cable pulleys 8 are provided in the back of the spaces formed by the extensions of the upper two guide rails 1. The cable ends 9 of the spring cable pulleys 8 extend over guide rollers 10, which are secured to the wall of the cabin, and are attached to the lower region of the front windowpane 2. Handgrips 11 that are disposed in the edge region of the front windowpane 2 serve for easy placement thereof. The process of moving the front windowpane 2 is furthermore facilitated in that the cable ends 9 are attached to the lower region of the windowpane and hence the springs of the spring cable pulleys 8 assist the movement of the windowpane in the range of their spring characteristic, which provides a very proportional force.

FIG. 3 also shows that in the closed position of the front windowpane 2, the lower portion thereof is pressed against the inner side of the frame 14 for the front window of the cabin due to the curved configuration of the lower ends 12 of the guide rails 1.

The lower portion of the illustration of FIG. 3 furthermore shows a support means via which the lower windowpane 5 can be wedged against the support means 7a, 7b.

Figure 4:
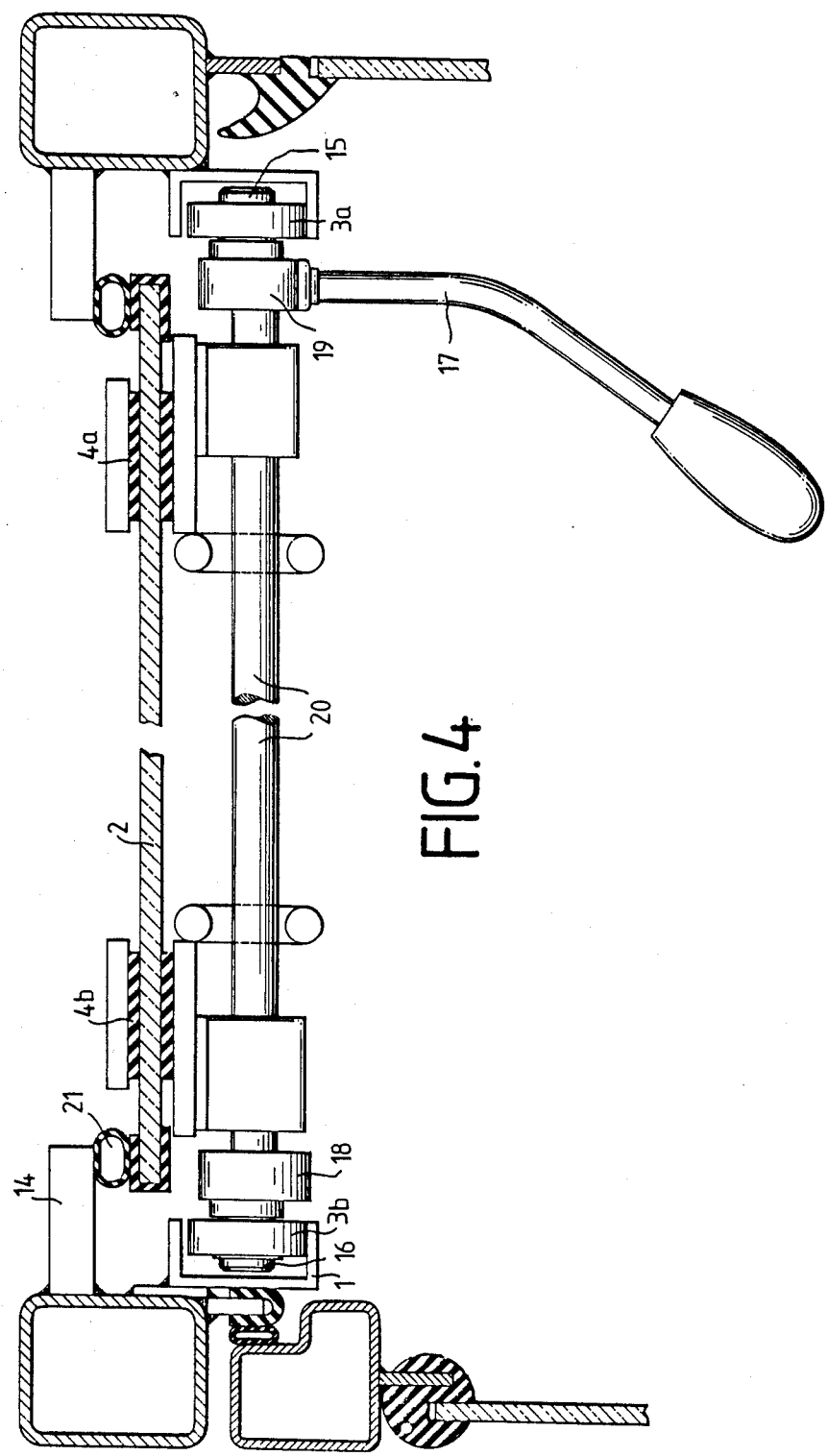
FIG. 4 is a cross-sectional view between the two upper corner regions of the front windowpane.

The cross-sectional view of FIG. 4 clearly shows that between the shafts 15, 16 of the roller bearings, a shaft 20 spans the two upper corner regions of the window; the shaft 20 can be pivoted or rotated by a hand lever 17, and is provided with lateral eccentric disks or wheels 18, 19 located coaxially with the shaft means 15, 16 and the roller bearings 3a, 3b. Rotation of the eccentric wheels 18, 19 guides the upper portion of the front windowpane 2 inwardly or outwardly, as a result of which a releasing or fixing of the front windowpane 2 from or to the frame 14 for the front window of the cabin over the entire range of the guide rails can be effected. Support of the front windowpane 2 in the guide rails 1 is furthermore effected via the roller bearings 3a and 3b.

As can be seen from FIG. 4, a sealing bead means 21 is expediently provided between the front windowpane 2 and the frame 14 for the front window of the cabin.

FIG. 5 illustrates the fixed front windowpane 2 in its upper end position in the interior roof space. Provided on the outer side of the front windowpane 2, in each upper corner region, are means for an insertion-type connection for fixing the windowpane in its end position when insertion means 22 and receiving means 23 disposed in a cooperating position are joined.

Also clearly shown in FIG. 5 is the reciprocal displacement of the central axis 24 of the eccentric wheels relative to the central axis 25 of the shaft 20.

Pressing the hand lever 17 upwardlY releases the front windowpane 2 from its insertion connection by rotating the eccentric wheels 18, 19 and makes it possible to freely shift the windowpane 2 in the forward direction of the cabin.

As can be seen from the drawings, the work or operation cabin can represent the driver's or operator's cab of a mobile machine. Especially in such a case it is a significant advantage to be able to assure an easy movability of the large front windowpane, especially without having to provide therefor any additional space. In particular, the present invention makes it possible to achieve a direct path, i.e. a path that is free of the windowpane, from the operator to the work site, without thereby having to guide the front windowpane either into the region of the operating mechanisms or toward the work site itself, for example, by swinging the windowpane out toward the front.

As mentioned previously, the front windowpane can be fixed in position in any intermediate position over the entire path of the guide rails, in which connection it is in particular also possible to effect a locking of the front windowpane 2 in the front region via the hand lever 17.

The present invention is, of course, in no way restricted to the specific disclosure of the specification and drawings, but also encompasses any modifications within the scope of the appended claims.

What I claim is:

1. In a work cabin that has a front windowpane having lower portions, which is disposed in a frame of said cabin for a front window, has a closed position, and is to be introducible and selectively fixable in an interior roof space of said cabin having walls, and that has roller bearings, which are laterally articulated in the vicinity of corner regions of said front windowpane and are guided in two U-shaped guide rails of said cabin, the improvement comprising:

respective spring cable pulleys that are disposed adjacent the ends of upper portions of both of said guide rails, remote from said closed position of said front windowpane;

guide rollers secured to said walls of said cabin, a cable extending from said spring cable pulleys and having cable ends that are guided over said guide rollers and are attached to lower portions of said front windowpane when viewed in said closed position thereof;

a shaft that, when said front window pane is viewed in said closed position thereof, spans the two upper corner regions of said front windowpane between said roller bearings at said upper corner regions;

a hand lever provided on said shaft for rotating same; and eccentric wheels provided laterally on said shaft, whereby said upper region of said front windowpane, which is indirectly supported on said roller bearings that are associated with said upper corner regions thereof and on said guide rails, is guided into or out of said roof space of said cabin via rotation of said eccentric wheels, with said front windowpane thereby being releasable from or selectively fixable to said cabin frame for a front window over the entire path of said guide rails.

2. A work cabin according to claim 1, in which said guide rails have lower ends, remote from said roof space of said cabin, that are curved in such a way as to press said lower portions of said front windowpane, in said closed position thereof, against an inner side of said cabin frame for a front window.

3. A work cabin according to claim 1, which includes insertion-type connection means disposed on the outer side of said front windowpane, in each upper corner region thereof, and on the upper portions of said guide rails, remote from said closed position of said front windowpane, with said insertion-type connection means serving to secure said front windowpane in an open end position thereof.

4. A work cabin according to claim 3, in which said insertion-type connection means includes insertion means disposed at either said front windowpane or said guide rails, and receiving means in a cooperating position at the other of said front windowpane or said guide rails.

5. A work cabin according to claim 1, which includes handgrips in an edge region of the inner side of said front windowpane.

6. A work cabin according to claim 1, in which said front windowpane is part of a larger front window that is comprised of several individual panes.

7. A work cabin according to claim 6, in which those panes of said front window that are in addition to said front windowpane are removable from said cabin frame for a front window.

8. A work cabin according to claim 7, which includes insertion and support means combinations for effecting said removability of said additional panes of said front window.

9. A work cabin according to claim 1, which is the operator's cab of a mobile machine.

* * * * *